W. J. P. MOORE.
COTTER PIN.
APPLICATION FILED MAR. 16, 1918.

1,289,867.

Patented Dec. 31, 1918.
2 SHEETS—SHEET 1.

Inventor
William J. P. Moore
By his Attorney
Fred B. Parker

W. J. P. MOORE.
COTTER PIN.
APPLICATION FILED MAR. 16, 1918.
1,289,867.
Patented Dec. 31, 1918.
2 SHEETS—SHEET 2.
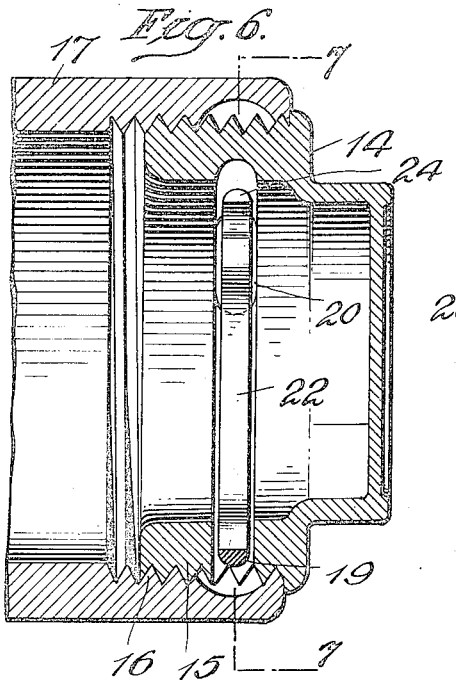
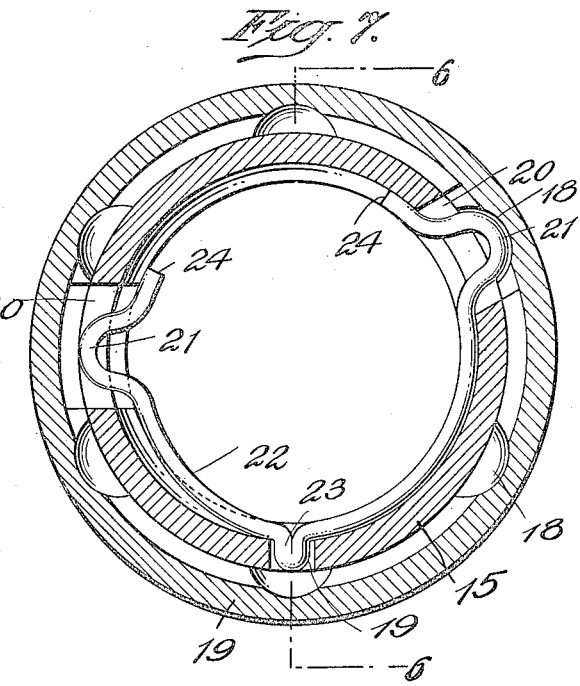
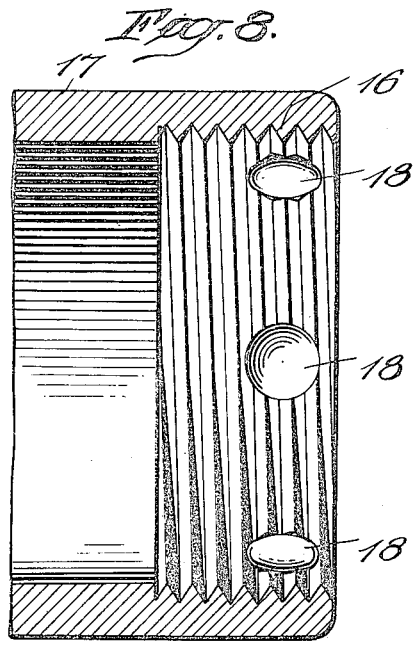
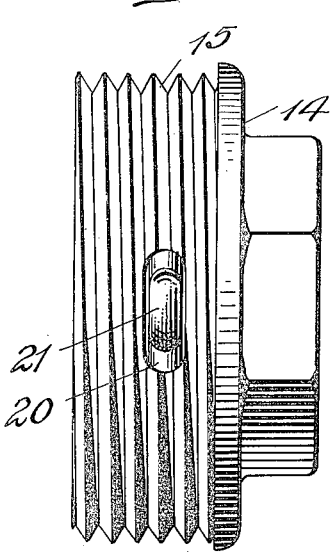
Inventor
William J. P. Moore,
By his Attorney
Fred A. Tasker

UNITED STATES PATENT OFFICE.

WILLIAM J. P. MOORE, OF NEW YORK, N. Y.

COTTER-PIN.

1,289,867. Specification of Letters Patent. Patented Dec. 31, 1918.

Application filed March 16, 1918. Serial No. 222,825.

*To all whom it may concern:*

Be it known that I, WILLIAM J. P. MOORE, a citizen of the United States, and resident of New York, in the county of New York and State of New York, have invented certain new and useful Improvements in Cotter-Pins, of which the following is a specification, reference being had therein to the accompanying drawing.

This invention refers to certain new and useful improvements in cotter pins. The object of the invention is to provide a simple and efficient pin of this character which will lock a nut firmly in any desired position, and also one which can be carried by the nut at all times and yet will automatically engage the bolt when the nut is being turned into position; thus avoiding the necessity of hunting for the bolt opening into which the pin may be inserted after the nut has been adjusted, or of unduly straining the nut in order to bring it to some desired point of adjustment. The invention may, therefore, be said to consist essentially in the construction, arrangement and combination of the various parts, substantially as will be hereinafter more fully described and claimed.

In the accompanying drawing illustrating my invention:

Fig. 6 is a longitudinal section on the line 6, 6 of Fig. 7 of a hub cap and its hub shell or casing or other similar part with my improved cotter pin arranged therewith for the purpose of locking the cap in any desired position of adjustment.

Fig. 7 is a cross-section on the line 7, 7 of Fig. 6.

Fig. 8 is a sectional detail of the internally screw-threaded casing which receives the hub cap.

Fig. 9 is a detail side view of the cap.

Similar characters of reference designate corresponding parts throughout the different figures of the drawing.

Figure 1:
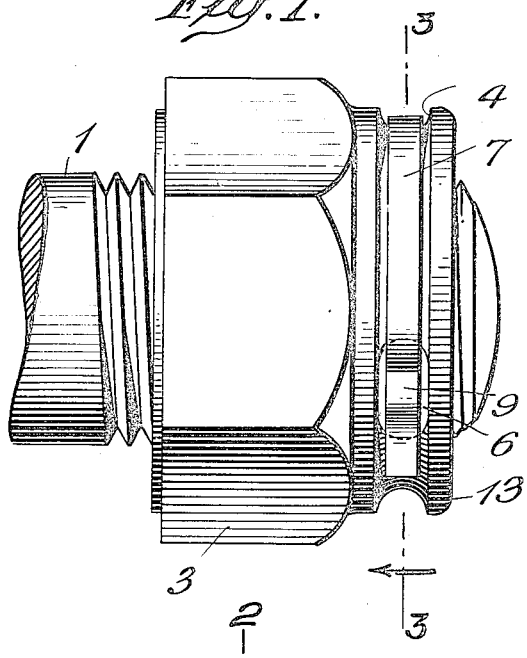
Figure 1 is a side view of a nut and a portion of a bolt, said nut being provided with my improved cotter pin.
Figure 2:
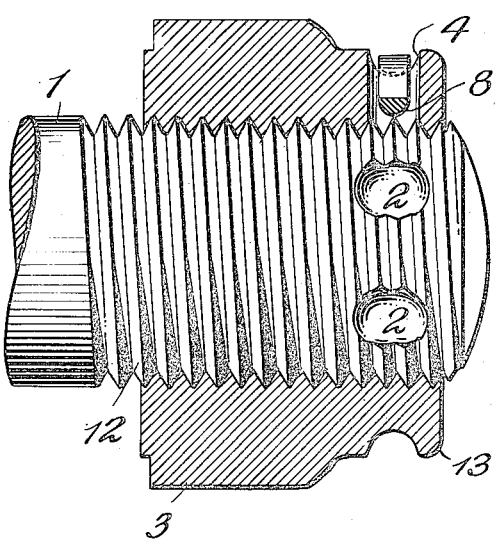
Fig. 2 is a longitudinal section of the same on the line 2, 2 of Fig. 3.
Figure 3:
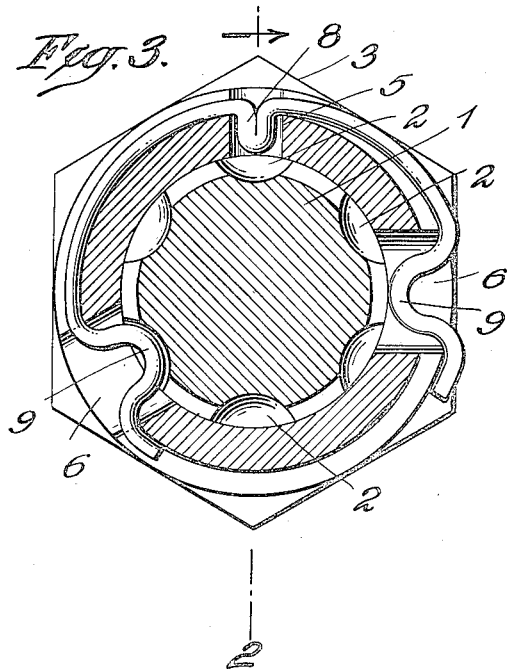
Fig. 3 is a cross-section on the line 3, 3 of Fig. 1.

1 denotes a bolt of any desired type or kind, and having a screw-threaded section 12 near one end which is provided with a series of grooves, notches, indents, or concave or conical recesses 2, of which there may be any suitable number, as for example, six, as shown in Fig. 3.

Screwing upon the screw-threaded section 12 of the bolt 1 is a nut of any desired character, being, for example, an ordinary hexagonal nut so as to provide a number of faces for the application of a wrench; and said nut 3 is provided with a round or cylindrical neck 13 formed with a circumferential groove 4 adapted to receive my improved cotter pin which closely hugs the bottom of the groove and thereby retains its position on the nut. Said grooved portion 4 is provided with a number of passages, as for example, the passage 5, and the passages 6, 6, the passage 5 being preferably smaller than the other passages 6, as it is designed to receive a smaller member of the cotter pin, and all of said passages being, as it were, cut on radial lines in order to enable the pin to function more actively and successfully with the nut.

Figure 4:
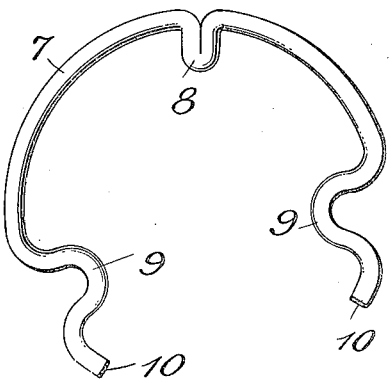
Fig. 4 is a detail view of my improved cotter pin.
Figure 5:
Fig. 5 is an edge view of the same.

The cotter pin itself appears in side view in Fig. 4 and in edge view in Fig. 5, and it is seen to consist of a length of wire 7 properly tempered or otherwise made so as to be resilient, and having a generally circular form, although the circle is not complete, and it is fashioned at intervals with bends, curves, or humps forming projections for purposes to be stated. The pin 7 by referring to Figs. 4 and 5 will be seen to have the free ends 10, 10 where the wire terminates, said ends being a greater or less distance apart. Contiguous to said ends or at some other suitable points in the length of the pin 7 are projecting humps 9, 9 formed by bending the wire inwardly, said humps being of such dimensions and shape that they will easily occupy and project slightly through the larger passages 6, while their inner curved ends are adapted to engage the grooves or recesses 2, in the bolt 1. Further the pin 7 is provided with an inwardly extending projection 8 formed by bending the wire so that two portions thereof will be pressed tightly together into the form of a small projecting pin which will be adapted to enter the smaller opening 5 in the nut 3. The said projection 8 will not pass entirely through the opening 5, but will rest therein, the purpose of said projection or pin 8 being to hold the cotter pin in position circumferentially while the humps or bent portions 9, 9 are actively engaged in creeping into and out of the shallow recesses 2, an operation which will naturally take place because of the fact that the pin 7 is of spring material which will cause the pin to hug the groove 4, as it has been bent to a slightly smaller diameter than the bottom of the groove 4. If the cotter pin is placed upon the nut at the time of its manufacture and before the nut is put on the bolt and turned up, (and this can be readily done,) it will be evident that the humps 9 while the nut is being turned up will be passing from one recess 2 to another in the series as long as the turning of the nut continues, and that the engagement of the humps 9 with the recesses 2 while not sufficiently tight to prevent the turning of the nut is still strong enough to keep the nut in place and entirely prevent any backward loosening of the nut which might result from the jarring or striking of the same.

The recesses 2 in the bolt are curved and shallow, being more or less concave, or conical, and it will thus be seen that the humps 9 need not always engage in the very bottom of said recesses to be effective, but may engage the sides thereof, but a small amount of engagement would be sufficient to hold the nut. Further only one of these bends 9 will be active at any one time, for while one of them is in one of the recesses 2, the other will be at a point midway between two of these recesses, as indicated in Fig. 3. Thus it will follow that although there are only six recesses, there are twelve points of possible contact or engagement that may be made by the humps 9, for each revolution of the nut. In other words, the circumference of the nut is divided into twelve parts and hence the adjustment can be made with a degree of fineness and nicety not usually possible and the cotter pin will effectively hold the nut in place at any one of these points. Thus the humps 9 are on radii that have different angles with the radius of the holding projection 8, so that when one hump 9 is active the other is idle.

The form of the invention shown in Figs. 6 to 9 is substantially equivalent to that shown in Figs. 1 to 5, the chief difference being that the cotter pin is formed with outwardly instead of inwardly projecting bends, humps or other members in order that it may serve in cases where the engagement is to be made between a screw-threaded sleeve instead of a nut and a surrounding concentric member, so that the sleeve may be prevented from becoming dislocated in like manner as the nut in the other example of the invention is kept tight and secure. An example of mechanism with which this reversed form of cotter pin is applicable is shown in these Figs. 6 to 9. It consists of a hub cap 14 having an externally screw-threaded portion 15 which screws into the internally-screw-threaded portion 16 of the hub shell, casing or barrel 17.

The screw-threaded portion 16 of the hub shell 17, as particularly shown in Fig. 8, is provided with a series of indents, notches or concave or conical recesses 18 of any suitable size, length and shape and similar to the concave recesses 2 in the bolt 1 in the form of the invention shown in Figs. 1 to 5. Further the screw-threaded portion 15 of the hub cap 14 is provided with a small passage 19 and larger passages 20, all preferably cut on radial lines similar to the passages 5 and 6 in Figs. 1 to 5, and having a similar function in that the reversed humps 21 of the pin 22 occupy the larger openings 20 and project through the same for the purpose of engaging the shallow recesses 18, while the reversely bent pin or projection 23 of the cotter pin 22, which corresponds to the inwardly extending projection 8 of the cotter pin 7, is designed to occupy a similar opening 19 in the hub cap. The cotter pin 22 is similar in all respects to the cotter pin 7 except that the anchoring part 23 projects in the opposite direction from the part 8 as already explained, and the locking bends 21 likewise project outwardly instead of inwardly like the bends 9 of the pin 7, but the pin itself is tempered so as to have an elastic quality and the humps 21 are preferably near the terminals 24 of the wire of which the pin is formed. And said pin lies in a retaining circumferential groove like the similar groove in the other form of the invention which grooves its hugs tightly as it is made on a diameter slightly larger than the bottom of said groove.

By equipping a hub cap, as 14, with a circular cotter pin having outwardly pressing members, as 21, which project through the external surface of the cap and ride on the interior of a surrounding threaded sleeve, as 17, into which the cap is being screwed, it will be evident that said spring humps or bends 21 will engage the grooves or recesses 18 in the sleeve 17, and will thus serve to lock or clamp the hub cap in a locked position and prevent it from being jostled out of place or becoming loosened in any way. There may be any number of these recesses 18, as for example, six, as shown in the drawing, in which case the cotter pin may have two bends 21 on different radii of the circle of the pin. It will be evident that only one of the humps 21 will be engaged at any one time, and when so engaged, the other hump will lie between two of the recesses 18. This arrangement, therefore, makes practically twelve engageable points when there are six recesses 18, and thus the cap can be adjusted with nicety in the same manner as nut 3 is adjusted in the other figures of the drawing.

It will, of course, be evident that the pin may be varied widely in the details of its construction. The circle thereof may be longer or shorter, and more or less complete, its cross-section may vary in shape, and there may be one or more of the projecting humps, and one or more of the anchoring projections, or lugs, or said anchoring lug may be entirely omitted and the pin depend upon the hump or humps for keeping it from moving out of place, and obviously there may be any number of recesses in the member to which the movable part, as a nut or cap, is locked, and I, therefore, reserve the liberty of making all these changes within wide limits for the purpose of enabling my invention to be applied as effectually as possible in order to bring about the best result in practical service.

Having thus described my invention, what I claim as new and desire to secure by Letters Patent, is:—

1. The combination with a grooved revoluble nut or the like, having radial openings therein, of a curved pin divided at one point and having free ends, and having also humps passing through said openings and engaging indents or recesses formed in a member with which the nut is used.

2. As a means for locking one adjustable member to another, a curved elastic wire divided at one point and having free ends and held loosely in position on one member, said curved wire having humps projecting through radial openings in said member and adapted to engage recesses formed in a series in another member.

3. The combination with a grooved revoluble nut or the like, of a curved pin divided at one point and having free ends, said pin being bent to engage an opening in the nut to keep the pin from being dislocated and being also bent at one or more points to provide projections that pass through other openings in the nut and engage indents or recesses formed in a series in a bolt or member with which the nut is used.

4. The combination with a grooved revoluble nut or the like, of a curved pin divided at one point and having free ends, said pin being bent at one or more points to provide projections that pass through other openings in the nut and engage indents or recesses formed in a series in a bolt or member with which the nut is used.

5. The combination with a grooved nut, of a circular cotter pin bent to form a projection at a point between its ends, which projection enters but does not pass entirely through a radial opening in the nut, said pin being also bent to provide two or more projections that pass through other radial openings in the nut and engage a series of recesses in a bolt on which the nut is adjusted for the purpose of locking the nut in any position.

6. In combination with a member to be locked, said member having a circumferential groove, a cotter pin consisting of a curved elastic wire having free ends separated from each other, said wire having a lug entering a passage in the wall of the member to be locked, and having also one or more humps likewise entering passages in the member to be locked and projecting through at the inner side of said passages so as to be adapted to engage indents in another member on which the aforesaid member is mounted to be locked thereto.

In testimony whereof I hereunto affix my signature.

WILLIAM J. P. MOORE.